United States Patent [19]

Chandler et al.

[11] 3,949,952

[45] Apr. 13, 1976

[54] FILM CARTRIDGE AND ASSOCIATED DRIVE MEANS

[75] Inventors: Jasper S. Chandler; Hugh R. McNair, both of Rochester, N.Y.

[73] Assignee: Eastman Kodak Company, Rochester, N.Y.

[22] Filed: Mar. 15, 1974

[21] Appl. No.: 451,640

[52] U.S. Cl. .............................. 242/194; 352/156
[51] Int. Cl.[2].. G03B 1/04; G11B 15/32; G03B 1/00
[58] Field of Search ........ 242/193, 194, 107, 107.1, 242/107.5; 185/37–40 R, 40 C; 352/72, 78 R, 156

[56] References Cited
UNITED STATES PATENTS

| | | | |
|---|---|---|---|
| 1,845,462 | 2/1932 | Wellman | 242/205 |
| 3,033,316 | 5/1962 | Foster | 185/37 |
| 3,561,851 | 2/1971 | Martin | 352/78 R |
| 3,716,205 | 2/1973 | Geuder | 242/194 |
| 3,719,417 | 3/1973 | Lecoeur | 352/78 R |
| 3,850,512 | 11/1974 | Scholz | 352/78 R |

*Primary Examiner*—Leonard D. Christian
*Attorney, Agent, or Firm*—K. D. Fosnaught

[57] ABSTRACT

A cartridge for handling an extended length of strip material, such as motion picture film, includes cooperating drive means for advancing such material through apparatus such as a motion picture camera. The cartridge defines a closed web loop operable effectively to slave the operation of a strip-driving member of the cartridge to the functioning of a strip-feeding member of the apparatus, and further includes a specially-mounted integral drive motor for responsively rotating a pair of storage spools on which the strip may be wound.

10 Claims, 8 Drawing Figures

FILM CARTRIDGE AND ASSOCIATED DRIVE MEANS

CROSS-REFERENCE TO RELATED APPLICATION

Reference is made to a commonly assigned copending U.S. patent application Ser. No. 451,714 entitled "Film Cartridge" filed on even date herewith in the names of E. Everett Dorland et al. Reference is also made to a commonly assigned copending U.S. patent application Ser. No. D-411,125 entitled "Design For Film Cartridge" filed on Oct. 30, 1973 in the names of Harvey H. Dudley et al.

BACKGROUND OF THE INVENTION

1. Field of the Invention

This invention relates to cartridges or cassettes of a type adapted to receive and handle an elongate strip of web material. In particular, it relates to a cartridge for containing a web of photosensitive film and for positioning in a camera equipped to expose the film to scene light. The invention contemplates use with film that is capable also of recording sound and with a camera operable to record both sound and scene light into such film.

2. Description of the Prior Art

Film cartridges of the general type shown herein include, for example, the familiar "super 8" cartridge which is adapted to contain a roll of 8mm film and to be positioned within a camera having suitable mechanism for sequentially exposing portions of the film to scene light. Cartridges of the super 8 type are described in U.S. Pat. No. 3,208,685 issued to Evan A. Edwards et al. on Sept. 28, 1965 and entitled "Anti-Friction Disc for Strip Material Cartridge" and in U.S. Pat. No. 3,208,686 issued to Evan A. Edwards et al. on Sept. 28, 1965 and entitled "Film Cartridge."

In addition, it is known to modify such super 8 cartridges to provide for sound recording on the film in the cartridge as is shown, for example, in U.S. Pat. No. 3,442,580. As disclosed therein, an intermittent film engaging mechanism advances the film frame by frame across an exposure aperture while a capstan drive arrangement advances the film past a sound recording head spaced from the exposure aperture.

A characteristic common to all of the above-mentioned cartridges, however, is that they are designed to be completely enclosed within the camera in which they are designed to be used. Because the size of the camera must be kept within reasonable limits, the above characteristic imposes a limitation on the amount of film that the cartridge can accommodate. In most instances, such a cartridge contains ample film for the user's purpose. However, in other instances, such as the filming of a particularly noteworthy event of considerable length, the film length may be inadequate and may require the user to install a fresh cartridge on one or more occasions during the filming. Under such circumstances, even though cartridge-loading cameras may be easily and swiftly reloaded, the resultant momentary interruption of filming may prove objectionable.

To provide a film cartridge capable of containing a length of film of, say, two or more times the amount contained in a cartridge of the type described above presents numerous problems. In addition to solving the problem of maintaining camera size within acceptable limits, a film transporting arrangement must be provided which is able to advance the long length of film through the cartridge while maintaining film tension forces at a relatively low level to avoid tearing the film or damaging the transporting mechanism. Additionally, if the film is of a type on which both sound and visual images may be simultaneously recorded, the film transport arrangement must also incorporate a provision for presenting the film to a suitable sound recording apparatus.

SUMMARY OF THE INVENTION

It is, therefore, an object of this invention to provide a film cartridge incorporating film transport means capable of reliably moving an extended length of film through the cartridge and past a film exposure aperture.

Another object of the subject invention is to provide, in such a transport arrangement, the capability of further presenting the film to a sound recording apparatus.

A further object is to provide such a film transport arrangement wherein the film is cooperatively driven for advancement through a cartridge by film feeding means carried by the apparatus that receives the cartridge in combination with driving apparatus provided in the cartridge.

A further object is to provide in such a cartridge a spring motor having a particular mounting arrangement for facilitating cartridge assembly and operation.

In accordance with a preferred embodiment of the present invention, a film cartridge includes a portion suitably dimensioned to be received within a camera and through which film may be advanced for presentation to an exposure aperture and a sound recording station. A second cartridge portion of expanded dimensions relative to the received portion and in communication therewith houses a pair of spools which rotate about a common axis and are adapted to store, pay out, and take up a strip of film or other web material of extended length. Within the received portion of the cartridge is provided means for engaging, transporting and guiding the film along a path which includes a closed loop segment. Film in the closed loop segment is presented for engagement by a film feeding mechanism carried by the receiving apparatus, and is also in engagement at two spaced locations with a rotatable film driving sprocket. The closed film loop effectively interconnects the feeding mechanism and the drive sprocket and, in combination with a snubbing device in the cartridge, enables rotation of the drive sprocket to be paced by . . . or slaved to . . . the functioning of the feeding mechanism.

A spring drive motor in the cartridge is operable to drive one of the paired film winding spools in response to rotation of the other such spool. The use of such motor in the cartridge simplifies camera design by obviating the need for a separate spool driving device in the camera. To facilitate assembly and operation of the cartridge and the spring motor, the invention provides for cupping a portion of the motor in order to effectively connect it to one of the spools, and also provides means for guiding such motor portion into cupping engagement.

BRIEF DESCRIPTION OF THE DRAWINGS

In the detailed description relative to the preferred embodiment of the invention presented below, reference is made to the accompanying drawings wherein.

DESCRIPTION RELATIVE TO A PREFERRED EMBODIMENT

Because photographic devices are generally well-known, the present description will be directed particularly to elements that form part of, or cooperate more directly with, the present invention. Apparatus that is not specifically shown or described herein is understood to be selectable from apparatus known in the art.

Figure 1:
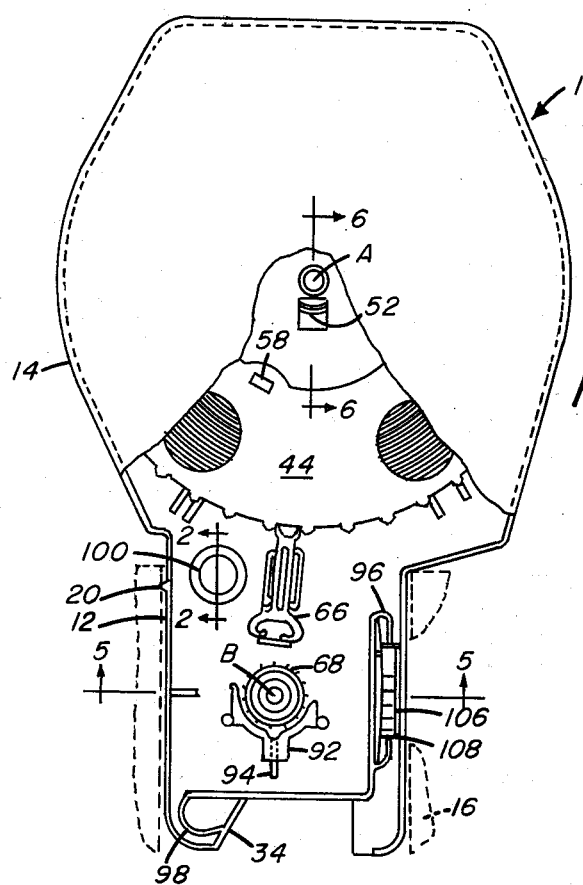
FIG. 1 is a top view of a cartridge embodying features of the subject invention and having a portion of a top wall thereof broken away.

FIG. 1 depicts a cartridge 10 operable to handle an extended length of web material and embodying features of the invention. Although the invention is herein cast in the environment of a cartridge for transporting photographic film, particularly film of the type that also includes a sound recording medium (such as a magnetic stripe), it will be understood that the invention is also useful in handling other types of web material, such as magnetic recording tape. Similarly, although described herein in conjunction with a camera, the invention is not limited to such use, but may also be adapted for use with other cartridge-handling apparatus, such as motion picture projectors, tape recording devices, and the like.

As seen in FIG. 1, cartridge 10 includes a relatively narrow portion 12 which is so sized as to be receivable in a camera or other cooperating apparatus 16 (shown in phantom lines), and a relatively expanded portion 14 adapted to extend exteriorly of the receiving apparatus and to store an extended length of film. Inasmuch as only the smaller portion 12 of the cartridge is received, this arrangement allows camera size to be minimized despite the relatively large film capacity of the cartridge. To restrict entry of actinic light rays through the camera opening through which the cartridge protrudes, a light lock tongue 20 is provided. Tongue 20 generally separates cartridge portions 12 and 14 and is adapted to cooperate with apparatus such as that shown in copending application Ser. No. 336,863 entitled "Door Assembly for a Motion Picture Camera" and filed on Feb. 28, 1973 in the names of H. H. Dudley et al.

Figure 2:
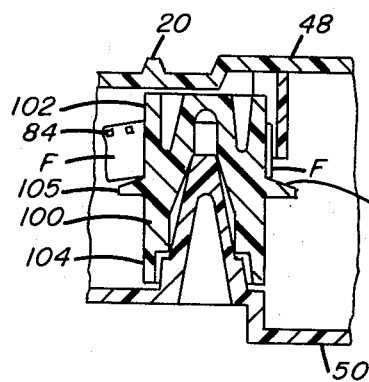
FIG. 2 is a view along line 2—2 of FIG. 1.
Figure 3:
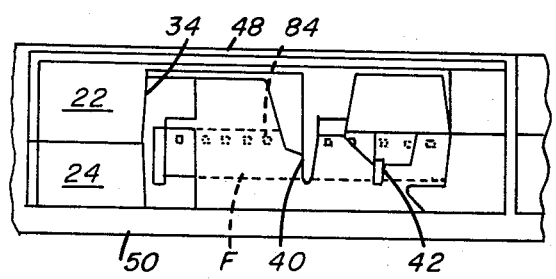
FIG. 3 is an end view of the cartridge shown in FIG. 1.

The cartridge is comprised of a cartridge body 22 and a cartridge cover 24 (see FIG. 4) which are formed (e.g., by molding) of an opaque material and are sealed together to provide a light-tight compartment (see also the above-referenced copending application of H. H. Dudley et al). In the received portion 12, an opening 26 is provided in a cartridge edge wall 28 to permit entry of a driven film-feeding member 30, such as a camera claw, into engagement with film edge perforations 84 (FIG. 2). Claw 30 may be positively driven by the camera for movement in a known manner in a rectilinear path whereby successive perforations 84 are engaged so as to intermittently move film F past opening 26 for presentation to an exposure aperture in the camera. As seen in FIG. 1, a film pressure pad 106 and associated spring 108 cooperate with claw 30 to assure correct positioning of film F with respect to the exposure aperture. A cartridge edge wall 32 adjacent and generally normal to edge wall 28, defines an opening 34 for admitting into contact with film F a device such as a magnetic sound recording head (not shown) carried by a camera for recording sound onto the sound recording portion of the film. Opening 32 is also sized to admit film feeding members such as a capstan 36 and a cooperating pressure roller 38 operable to advance the film past such sound recording device. To assist in positioning film F, the cartridge includes, in the area of opening 34, a guide finger 40 (see FIG. 3) of the type described in U.S. Pat. No. 3,767,294 issued on Oct. 23, 1973 in the name of Mr. Gerald J. Kosarko. Adjacent to finger 40 is located a film end retainer 42 of the type described in U.S. Pat. No. 3,785,726 issued on Jan. 15, 1974 in the name of Mr. Stephen H. Miller and adapted to cooperate with a discontinuity in the film to prevent advancement of the trailing portion of the film F past openings 26 and 34.

The cartridge houses, in its expanded portion 14, a pair of relatively rotatable flanged web-winding spools 44 and 46 (see FIG. 4 and FIG. 6) attached to opposite ends of film F and operable to store and receive or pay out such film. Spools 44 and 46 are suitably mounted for independent rotation with respect to each other and with respect to cartridge 10 about a common axis A which is oriented generally perpendicularly to opposed top and bottom (as viewed in FIGS. 1 and 4) cartridge side walls 48 and 50. As described more completely hereinafter, spools 44 and 46 are drivingly interconnected by means of a spring motor 52 operable to effect relative rotation of one spool in response to rotation of the other spool, such spools being rotated thereby in a common direction.

Spools 44 and 46 include, respectively, central hubs 54 and 56 (see FIG. 6) having means, such as attachment device 58 (FIG. 1), for securing an end of film F thereto for winding about the hubs. To accommodate wound film, each spool includes a pair of axially spaced flanges. Spool 44 thus includes flanges 58 and 60, and spool 46 includes flanges 62 and 64 (see FIG. 6). As described more completely in the above-referenced copending application Ser. No. 451,714 filed in the names of E. E. Dorland et al., the cartridge includes a reciprocable lock member 66 operable to engage the adjoining spool flanges 60 and 62 to prevent movement of film F through the cartridge when the cartridge is not received in a camera or similar apparatus.

Figure 4:
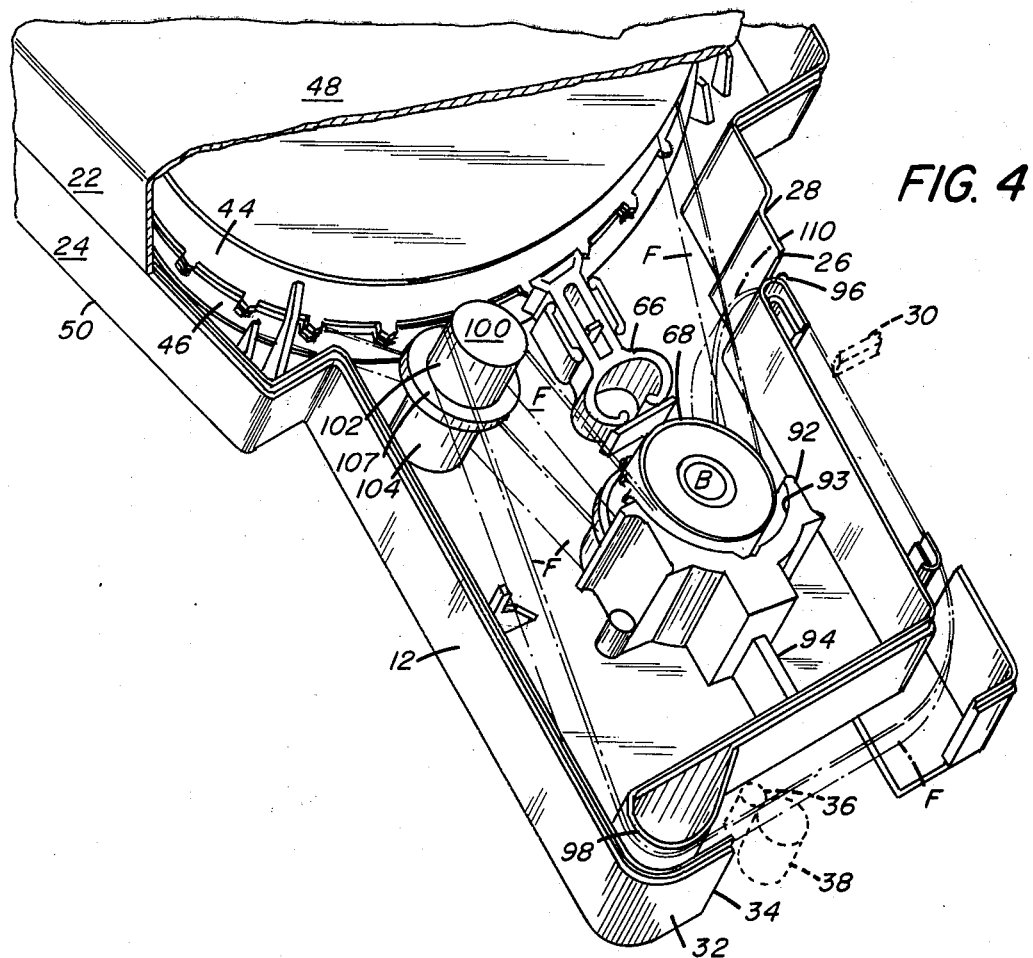
FIG. 4 is a partial perspective view of the cartridge shown in FIG. 1.
Figure 5:
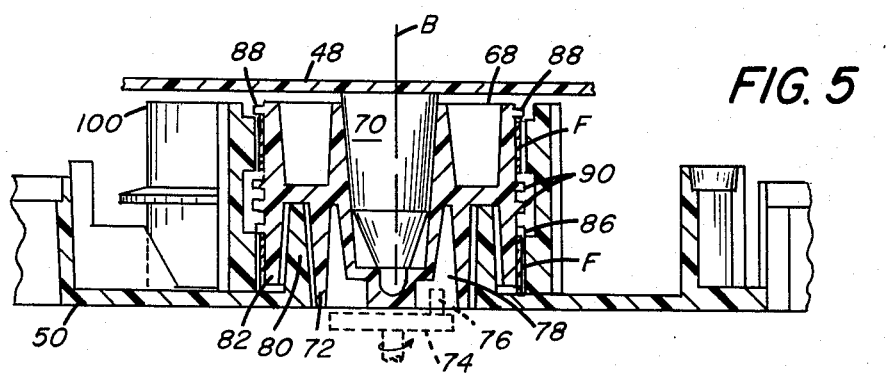
FIG. 5 is a view along line 5—5 of FIG. 1.

The narrow receivable portion 12 of the cartridge houses apparatus for use in advancing film through the cartridge. As seen in FIGS. 4 and 5, the cartridge includes a film-drive sprocket 68 which is mounted for rotation about an axis B that is disposed generally parallel to the spool axis A. The sprocket is rotatably mounted on a spindle 70 carried by cartridge side wall 48. The opposite axial end of the sprocket is received in a circular opening 72 formed in side wall 50, whereby the sprocket may be engaged and rotated by a rotary drive member 74 of the cooperating camera or other apparatus. As seen in FIG. 5, driving engagement between members 74 and 68 may be applied by means of a stud 76 carried by member 74 and disposed to bear against a radial sprocket wall 78. An annular cup 80 carried by cartridge wall 50 and surrounding the circular opening 72 provides, in combination with an annular cup-receiving well 82 formed in sprocket 68, a labyrinthine arrangement for restricting the entry of actinic light rays through opening 72.

For purposes to be more fully described hereinafter, sprocket 68 is adapted to engage film F simultaneously at two spaced locations on the film to assist in transporting such film. Accordingly, sprocket 68 includes two axially-spaced sets of sprocket teeth, designated 86 and 88, for engaging perforations 84 (see FIGS. 2 and 3) carried by the film F. Sprocket teeth 86 are disposed for film engagement at a first, or lower (as seen in FIG. 5), axial level corresponding generally to the axial level of film spool 46. Sprocket teeth 88 are arranged to engage film F at a second, or upper, axial level generally corresponding to the axial level of film spool 44. Annular film-separation ridges 90 serve to separate the two film levels of the sprocket.

A generally Y-shaped movable film keeper shroud 92 cooperates with sprocket 68 to assure continuous film-sprocket engagement. Shroud 92 is mounted for sliding movement along a guide bar 94 between a retracted position which facilitates threading film F around sprocket 68 during cartridge-loading operations, and a film-retaining position (FIG. 4, for example) in which a curved inner face 93 of the keeper lies in closely spaced relationship with the outer periphery of sprocket 68 to assure that film F remains in engagement with sprocket teeth 86 and 88 after the cartridge is loaded with film and assembled.

To assist in guiding film F through the cartridge, a pair of curved snubber walls 96 and 98 are provided together with a rotatable bi-level idler roller 100. As seen in FIGS. 1 and 4, snubber wall 96 is disposed adjacent to the picture aperture 26, and snubber wall 98 is disposed adjacent to the sound aperture 34. Snubber walls 96 and 98 are both disposed for snubbing engagement with film F, in a manner to be more fully described hereinafter, at a level corresponding to the aforementioned first, or lower, level of sprocket 68. Idler roller 100 is constructed to engage film F at such first level as well as at a second, upper, level corresponding to the upper level of sprocket 68. The roller thus includes upper and lower generally cylindrical film-engaging surfaces, 102 and 104 (see FIGS. 2 and 4) and an annular ridge 105 which effectively separates surfaces 102 and 104. Desirably, ridge 105 includes a generally conical upper surface 107 to provide non-abrupt transition of film F during movement thereof between the upper and lower cartridge levels (see FIG. 2).

As previously indicated, the handling and transportation of an extended length of film in a cartridge presents certain problems not encountered with film of lesser length. Foremost in this respect is the relatively high inertia presented by the larger film load. Motion picture film is characteristically subjected to abrupt incremental movement, as by a camera claw, as each frame of the film is individually presented to a camera exposure aperture. The high inertia of an extended length of film may present sufficient resistance to such movement to cause failure of the camera's film-feeding mechanism or tearing of the film in the area of engagement by such film-feeding mechanism. Accordingly, the subject invention contemplates a cooperative film-driving arrangement that avoids undue stress on the film and on the camera apparatus, and which also permits the use of a camera drive mechanism of simplified construction.

The cartridge provides for such cooperative film driving engagement by the film-feeding mechanism in the camera (e.g., camera claw 30 or capstan 36) in combination with cartridge drive sprocket 68, and utilizes a closed loop portion of the film itself to couple the driving forces. In operation, film F is unwound from one of the two spools 44 and 46, engaged by sprocket 68, guided past openings 26 and 34, re-engaged by sprocket 68 to thereby form the closed film loop, and is ultimately rewound on the other one of the two spools. As indicated, the film advancing and rewinding mechanisms described herein are capable of advancing film either from spool 44 to spool 46 or from spool 46 to spool 44. In the following description, however, it will be assumed that film is being advanced from spool 46 to spool 44.

As is perhaps best seen in FIG. 4, the path of film F through the cartridge includes three separate runs and two separate axial levels. A first run extends from the film supply spool (spool 46), across the first, or lower, film-guiding surface 104 of idler roller 100 and into engagement with sprocket teeth 86 at the first, or lower, axial level of sprocket 68. The film continues around sprocket 68 at such lower level and enters a second run. The second run extends along the lower level past openings 26 and 34, whereupon it climbs to the second, or upper, level and is trained around the upper guiding surface 102 of idler roller 100. The final portion of the second run extends from the upper level of roller 100 to the upper level of sprocket 68 for engagement by sprocket teeth 88. The film, upon exiting from the upper level of sprocket 68, extends along a third run to spool 44 for rewinding thereon.

Since film in the second run is in engagement with sprocket 68 at two spaced locations on the film, i.e., at the beginning of the second run (by teeth 86) and at the end of the second run (by teeth 88), such second run effectively comprises the aforementioned closed film loop. As explained below, such closed loop effectively couples together the film-feeding apparatus and the cartridge sprocket to form a cooperative driving arrangement.

In this regard, film F moving along the second (closed loop) run in the direction described above is initially engaged and fed into alignment with the exposure aperture by camera claw 30. As seen in FIG. 4, some excess of film is provided in the form of a free film loop 110 in the area of curved wall 96. Such free loop avoids image unsteadiness during filming by avoiding tensioning of the film between claw 30 and sprocket 68 to assure that each image area of the film is freely movable by claw 30 into alignment with the exposure aperture of the camera. After passing cartridge opening 26, film F is guided along the inner surface of edge wall 28, then along the inner surface of edge wall 32 and past opening 34. If film F is of a type capable of recording sound, film F may be engaged and driven in the area of opening 34 by a capstan 36 and pressure roller 38 carried by the camera, whereby the film may be advanced past associated sound recording devices (not shown) also provided in the camera.

Although claw 30 and capstan 36 must be driven in synchronization to avoid unduly tensioning film F therebetween, the instant closed film loop arrangement avoids the need to synchronize also the rotation of sprocket drive 74. Instead, sprocket drive 74 need only be tendency driven in the intended direction of film advancement, as by a slip-clutch arrangement known in the art, with rotation of the sprocket 68 being governed by advancement of the film F itself. In this regard, a film-braking action provided by snubber wall 98 tends to prevent sprocket rotation. When such snubbing action is released in response to advancement of exposed film F by the pressure roller-capstan combination, film F may advance past snubber wall 98, thereby permitting sprocket 68 to rotate under the influence of its drive member 74. Such rotation simultaneously strips film from supply spool 46, feeds such film into the free loop 110 for advancement through the closed film loop, and feeds exposed film into the third film run for rewinding on takeup spool 44. It will be understood that, in the event that the camera does not include the capstan-pressure roller combination (36 and 38), release of the snubbing engagement is provided by the advancement of film by claw 30. Further, if film is to be transported through the closed loop in a direction opposite to that described above (i.e., if film is to be transported from spool 44 to spool 46), snubbing engagement is provided by snubber wall 96 instead of snubber wall 98.

In the cartridge described above, the film feeding means in the camera (e.g., the capstan 36 or claw 30) effectively paces the film-driving sprocket 68. This arrangement obviates the need for means in the camera for mechanically synchronizing such elements. In addition, however, it also provides a sprocket pacing that is responsive only to actual functioning of the film feeding means (i.e., actual feeding of the film), rather than to mere movement of such means as is typical of mechanical synchronizing. Therefore, in the event that movement of the feeding means (e.g., rotation of capstan 36) fails to result in film F being fed (e.g., because of a malfunctioning of pressure roller 38), no responsive rotation of sprocket 74 will occur and film F will cease to be advanced through the cartridge, thereby indicating a malfunction and avoiding wastage of film.

The cartridge also includes structure that avoids the need for providing spool-driving mechanism in the camera, thereby permitting reduced camera size and achieving reduction in the amount of power needed to operate the camera. In this regard, the cartridge includes a spring motor 52 which, as seen in FIGS. 6–8, drivingly interconnects spools 44 and 46 to produce rotation of one spool in response to rotation of the other spool.

Figure 6:
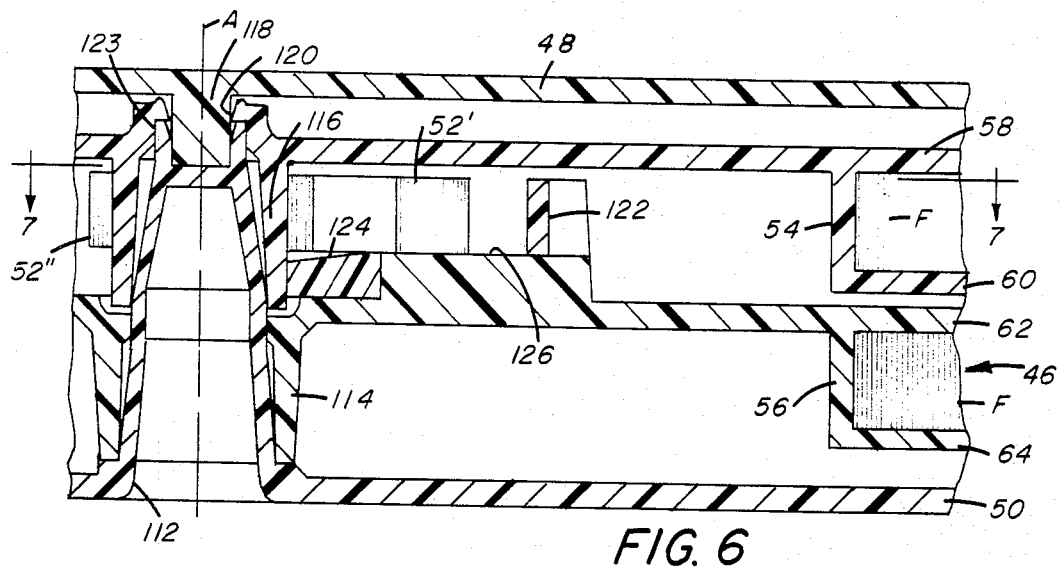
FIG. 6 is an enlarged view along line 6—6 of FIG. 1.

As shown in FIG. 6, spools 44 and 46 are mounted on a spindle 112 for coaxial rotation about an axis A. Spool 46 includes an annular bearing wall 114 for receiving spindle 112, and spool 44 contains a similar annular bearing wall 116. A pin 118 carried by cartridge wall 48 extends through a central circular opening 120 in spool 44 and enters into telescoped relation with a cup 123 formed at the end of spindle 112 as to lend structural stability to spindle 112.

Figure 7:
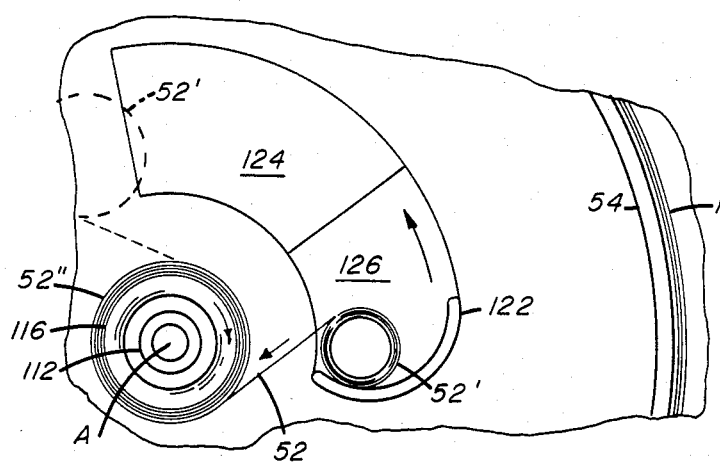
FIG. 7 is a view along line 7—7 of FIG. 6 and shows the cartridge at a first stage of operation.
Figure 8:
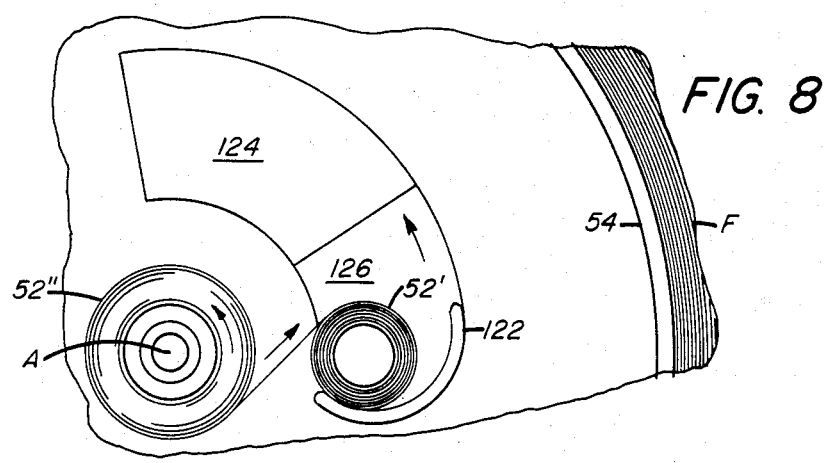
FIG. 8 is a view corresponding to the view of FIG. 7 and depicting the cartridge at a second stage of operation.

Spring 52 is comprised of an elongate metal strip attached at one end to bearing wall 116 and initially so formed that a majority of its length is wound into a single coil 52' (shown in phantom in FIG. 7). Spool 46 carries a curved saddle member 122 operable to engage the outer periphery of the spring coil so as to position such coil with respect to spool 46. An integral curved ramp member 124 serves to guide such coil onto a platform 126 to position the spring coil axially for engagement by saddle 122. Advantageously, spring 52 may be of a type known in the art (see, for example, U.S. Pat. No. 2,063,799) and operable to present decreasing or generally constant tension in response to its extension. When a portion of such a spring is unwound from its single coil configuration and rewound into a second coil of different curvature, such as by reverse winding into a coil 52'' as shown in FIG. 7, the spring is operable to produce torque.

After assembly of the spools 44 and 46 onto spindle 112, the spring 52 is placed in an operative configuration by effecting relative rotation of such spools in the direction shown by arrows in FIG. 7. Such rotation causes the spring coil 52' (phantom lines in FIG. 7) to be guided up ramp 124, onto platform 126 and to be cupped within saddle 122 of spool 46. Continued rotation causes spring coil 52' to unwind and be rewound around bearing wall 116 of spool 44 so as to form a second spring coil 52''. After rotation of an amount sufficient to transfer about eighty percent of the total length of spring 52 to coil 52'' the spring motor achieves its initial operating configuration shown in FIG. 7 and is ready for use.

When spring motor 52 is in such configuration, film F will be substantially entirely wound on supply spool 46 with its remaining length extending through the cartridge and attached to spool 44. Accordingly, it will be apparent that the effective diameter of spool 46 will be considerably larger than the effective diameter of spool 44. When film F is unwound from spool 46 and advanced through the cartridge, the resultant rotation of spool 46 in combination with spring motor 52 tends to rotate spool 44 in the same direction as spool 46 so as to wind the exposed film onto spool 44. Because of the differing effective spool diameters, more than one revolution of spool 44 is required to wind the length of film F produced by a single unwinding revolution of spool 46. As a result, spring 52 is permitted to uncoil from its larger coil 52'' and recoil into coil 52' as seen in FIG. 8 thereby producing winding rotation of spool 44.

As film winding continues, the effective spool diameters become equalized and spring 52 ceases to uncoil, at which point about eighty percent of spring 52 is contained in spring coil 52'. Additional film advancement causes the effective diameter of spool 44 to exceed the diameter of spool 46 whereupon spool 44 slows its rotation with respect to spool 46. Spring 52 is then forced by saddle 122 to uncoil from its eccentric coil 52' and recoil into coil 52''. Upon completion of winding film F is almost entirely wound on spool 44 and spring 52 has returned to its original configuration shown in FIG. 7.

During the operation described above, saddle 122 reliably retains spring coil 52' in its eccentric position with respect to spool axis A, while platform 126 in combination with the opposing surface of spool flange 58 maintain coil 52' at a desired axial level and prevent tilting or telescoping of coil 52'. Saddle 122 facilitates cartridge assembly operations by obviating the need to provide a mounting drum or post for coil 52' and eliminates the attendant difficulties encountered in attaching and mounting the spring coil on such structure. Since saddle 122 includes no moving parts, construction of the cartridge is facilitated and operation of the cartridge is made more reliable.

This invention has been described in detail with a particular reference to a preferred embodiment thereof, but it will be understood that variations and modifications can be effected within the spirit and scope of the invention.

We claim:

1. A web-handling cartridge for use with cartridge-receiving apparatus having web-feeding means, said cartridge having a web housing portion operable to extend exteriorly of said apparatus when said cartridge is received therein and including first and second web winding spools for accommodating respective portions of a wound web, said spools being disposed for independent coaxial rotation within said housing, said cartridge comprising:
   1. means for defining a web path along which a web portion wound on one of said spools may be unwound and advanced to the other of spools for winding thereon, said means including
      a. rotatable drive sprocket means for use in advancing a web along said path and for so engaging said web at two spaced locations on said web as to define a closed web loop path of fixed length,
      b. means for presenting web material in said web loop for movement by said web-feeding means of said apparatus, and
      c. curved wall means disposed for snubbing engagement with said web at a location along said closed loop path between said presenting means and said sprocket means and spaced from said presenting means in the direction of web advancement from said first spool to said second spool;
   2. spool drive means for imparting winding rotation to said one spool in response to unwinding rotation of said other spool, said drive means including a spring motor comprising an elongate resilient strip member so formed as to define
      a. a first spiral coil in concentric engagement with said second spool,
      b. a second spiral coil in eccentric engagement with said first spool and having a central axis generally parallel to the central axis of said first coil, and
      c. an intermediate strip portion interconnecting said coils and intersecting a plane defined by said coil axes.

2. A web-handling cartridge for use with cartridge-receiving apparatus having web-feeding means, said cartridge having a web housing portion operable to extend exteriorly of said apparatus when said cartridge is received therein and including a web supply spool for storing and unwinding a wound web and a web takeup spool for winding and storing said web, said spools being disposed for independent coaxial rotation within said housing, said cartridge comprising:
   1. means for defining a web path along which a web wound on said supply spool may be unwound and advanced to said takeup spool for winding thereon, said means including
      a. rotatable drive sprocket means for use in advancing a web along said path and for so engaging said web at two spaced locations on said web as to define a closed web loop path of fixed length, said sprocket means comprising a generally cylindrical member having an axis of rotation and having a first set of circumferentially spaced web-engaging teeth disposed in a first plane normal to said axis and a second set of circumferentially spaced web-engaging teeth disposed in a second plane normal to said axis and spaced along said axis from said first plane,
      b. means for presenting web material in said web loop for movement by said web-feeding means of said apparatus, and
      c. wall means disposed for snubbing engagement with said web at a location along said closed loop path between said presenting means and said sprocket means and spaced from said presenting means in the direction of web advancement,
   2. spool drive means for imparting winding rotation to said takeup spool in response to unwinding rotation of said supply spool, said drive means including a spring motor comprising an elongate resilient strip member so formed as to define
      a. a first spiral coil in concentric engagement with said web takeup spool,
      b. a second spiral coil in eccentric engagement with said web supply spool and having a central axis generally parallel to the central axis of said first coil, and
      c. an intermediate strip portion interconnecting said coils and intersecting a plane defined by said coil axes,
   3. said supply spool including
      a. means for positioning said second coil with respect to said supply spool, said positioning means including a curved wall disposed to bear against the outermost convolution of said second coil; and
      b. ramp means carried by said supply spool for positioning said second coil at a predetermined level along said spool axis.

3. A cartridge for use with cartridge-receiving apparatus of the type having web-feeding means, said cartridge having a web housing portion operable to extend exteriorly of said apparatus when said cartridge is received therein and including first and second web winding spools for accommodating respective portions of a wound web, said spools being disposed for independent coaxial rotation within said housing, said cartridge comprising:
   1. A strip of photosensitive web material extending between and having respective portions thereof wound upon said spools;
   2. means for unwinding and advancing said web from one of said spools to the other of said spools for winding on said other spool, said means including
      a. rotatable drive sprocket means for use in advancing said web and for so engaging said web at two spaced locations on said web as to define a closed web loop of fixed length,
      b. means for presenting a portion of said web loop for movement by said web feeding means, and
      c. curved wall means disposed for snubbing engagement with said web loop at a location on said loop between said presenting means and said sprocket means and spaced from said presenting means in the direction of web advancement from said first spool to said second spool,
   3. spool drive means for imparting winding rotation to said one spool in response to unwinding rotation of said other spool, said drive means including a spring motor comprising an elongate resilient strip member so formed as to define
      a. a first spiral coil in concentric engagement with said second spool,
      b. a second spiral coil in eccentric engagement with said first spool and having a central axis generally parallel to the central axis of said first coil, and c. an intermediate strip portion interconnecting said coils and intersecting a plane defined by said coil axes.

4. The invention of claim 3 wherein said first spool includes means for positioning said second coil with respect to said first spool, said positioning means including a curved wall disposed to bear against the outermost convolution of said second coil.

5. The invention of claim 3 wherein said photosensitive web further includes means for recording sound and wherein said cartridge includes means for presenting said web to sound recording apparatus.

6. The invention of claim 3 wherein said cartridge is further operable to advance said web along said path from said second spool to said first spool and wherein said cartridge further includes second curved wall means disposed for snubbing engagement with said web at a location along said closed loop path between said presenting means and said sprocket means and spaced from said presenting means in said direction of advancement from said second spool to said first spool.

7. The invention of claim 6 wherein said sprocket means comprises a generally cylindrical member having an axis of rotation and having a first set of circumferentially spaced web-engaging teeth disposed in a first plane normal to said axis and a second set of circumferentially spaced web-engaging teeth disposed in a second plane normal to said axis and spaced along said axis from said first plane.

8. The invention of claim 4 including ramp means carried by said first spool for positioning said second coil at a predetermined position along the axis of rotation of said first spool.

9. The invention of claim 8 wherein said resilient strip member means is operable to uncoil from one of said spiral coils and to recoil into the other of said spiral coils in response to said spool rotation.

10. A cartridge for handling and transporting web material and having a pair of web handling spools mounted for independent rotation about a common axis, said cartridge further including means for rotating one of said spools in response to rotation of the other of said spools, said means comprising resilient strip member means so wound as to define
a. a first spiral coil
b. a second spiral coil, and
c. an intermediate portion interconnecting said coils; said first spiral coil being disposed for concentric engagement with one of said spools, and said second spiral coil being arranged for eccentric engagement with the other of said spools, said other spool including means for bearing against the outer convolution of said second coil to position said second coil radially with respect to said other spool, said other spool further including ramp means in communication with said bearing means for positioning said second coil axially with respect to said other spool.

* * * * *